(12) United States Patent
Lenzini et al.

(10) Patent No.: US 8,031,660 B2
(45) Date of Patent: Oct. 4, 2011

(54) DATA TRANSMISSION METHOD, SYSTEM, BASE STATION, SUBSCRIBER STATION, DATA PROCESSING UNIT, COMPUTER PROGRAM PRODUCT, COMPUTER PROGRAM DISTRIBUTION MEDIUM AND BASEBAND MODULE

(75) Inventors: Luciano Lenzini, Leghorn (IT); Enzo Mingozzi, Pisa (IT)

(73) Assignee: Nokia Corporation, Espoo (FI)

( * ) Notice: Subject to any disclaimer, the term of this patent is extended or adjusted under 35 U.S.C. 154(b) by 2008 days.

(21) Appl. No.: 10/630,971

(22) Filed: Jul. 31, 2003

(65) Prior Publication Data
US 2004/0228296 A1 Nov. 18, 2004

(30) Foreign Application Priority Data
May 14, 2003 (FI) .................................... 20030724

(51) Int. Cl.
*G01R 31/08* (2006.01)
*H04J 3/22* (2006.01)
(52) U.S. Cl. .................... 370/329; 370/468; 370/230.1; 370/231; 370/232
(58) Field of Classification Search .................. 455/408, 455/407, 450, 452.2; 370/328, 329, 330, 370/230.1, 231, 232, 468
See application file for complete search history.

(56) References Cited

U.S. PATENT DOCUMENTS

| 6,272,117 | B1 * | 8/2001 | Choi et al. | 370/330 |
| 6,317,234 | B1 * | 11/2001 | Quayle | 398/9 |
| 6,671,512 | B2 * | 12/2003 | Laakso | 455/453 |
| 7,016,317 | B1 * | 3/2006 | Pathak et al. | 370/329 |
| 2002/0080816 | A1 * | 6/2002 | Spinar et al. | 370/449 |
| 2002/0107026 | A1 | 8/2002 | Agrawal et al. | |
| 2003/0032427 | A1 * | 2/2003 | Walsh et al. | 455/428 |
| 2004/0228296 | A1 * | 11/2004 | Lenzini et al. | 370/322 |

OTHER PUBLICATIONS

IEEE Standard for Local and metropolitan area networks (Part 16: Air Interface for Fixed broadband wireless access systems) Dec. 6, 2001.*
IEEE Std 802.16tm 2001 (Part 16: Air Interface for Fixed Broadband Wireless Access System), Dec. 6, 2001.*
IEEE Standard for Local Metropolitan Area Networks, Part 16: "Air Interface for Fixed Broadband Wireless Access Systems," LAN/MAN Standards Committee of the IEEE Computer Society and the IEEE Microwave Theory and Techniques Society; Dec. 6, 2001.
Japanese Office Action, JP Application No. JP 2006-508326, Issued: Sep. 1, 2008, English Translation: pp. 1-2.
Dr. Jiunn Deeng and Ruay-Shiung Chang, "A Nonpreemptive Priority-Based Access Control Scheme for Broadband Ad Hoc Wireless ATM Local Area Networks," IEEE Journal, Sep. 2000, vol. 18, No. 9, pp. 1731-1739.

(Continued)

Primary Examiner — Dwayne Bost
Assistant Examiner — Joshua Schwartz
(74) Attorney, Agent, or Firm — Mintz, Levin, Cohn, Ferris, Glovsky and Popeo, P.C.

(57) ABSTRACT

A data transmission method in a communication system including transmitting at least one capacity request message from a subscriber station, granting capacity subscriber station-specific by a base station, transmitting at least one capacity grant message from the base station, allocating granted capacity connection-specific by the subscriber station, transmitting from the subscriber station at least one message, which includes information on previous capacity requests, transmitting data from the subscriber station according to capacity allocation, monitoring by the base station request messages, capacity grant messages and received transmissions.

15 Claims, 5 Drawing Sheets

OTHER PUBLICATIONS

English Translation of the Notification of the second Office Action dated Nov. 6, 2009, issued by the Patent Office of the People's Republic of China, issued in connection with counterpart Chinese application No. 200480013113.X.

GuoSong Chu, et al., "A QoS Architecture for teh MAC Protocol of IEEE 802.16 BWA System, Communications, Circutis and Systems and West Sino Expositions", IEEE 2002 International Conference, Jul. 1, 2002, vol. 1, pp. 435-439.

* cited by examiner

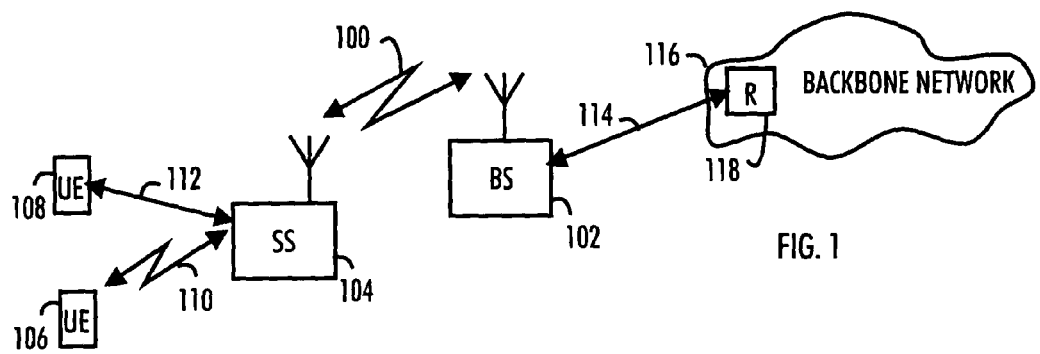
FIG. 1
FIG. 2A
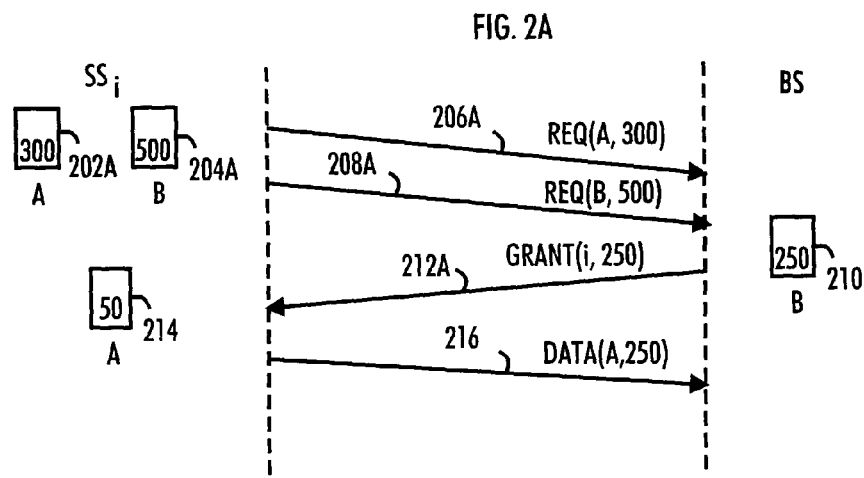
Prior Art
FIG. 2B
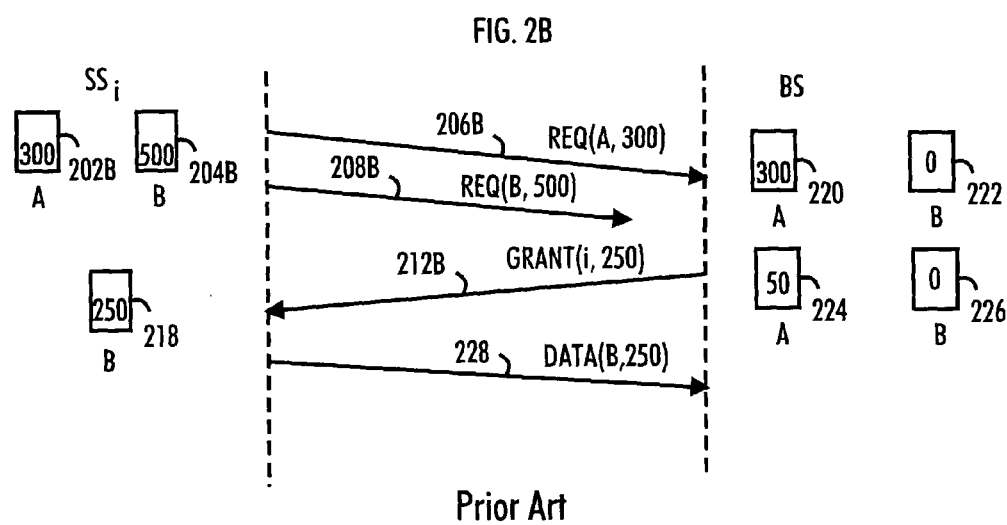
Prior Art

DATA TRANSMISSION METHOD, SYSTEM, BASE STATION, SUBSCRIBER STATION, DATA PROCESSING UNIT, COMPUTER PROGRAM PRODUCT, COMPUTER PROGRAM DISTRIBUTION MEDIUM AND BASEBAND MODULE

BACKGROUND OF THE INVENTION

1. Field of the Invention

The invention relates to a data transmission method in a communication system, the system including at least one base station and at least one subscriber station, which subscriber station allocates capacity for connections. The invention also relates to a data transmission system, a base station and a subscriber station. The invention relates especially to packet transmission.

2. Description of the Background

Modern access systems support different higher layer protocols, which define the format and order of messages exchanged between two or more communication entities, as well as the actions taken on the transmission and/or reception of a message. The central task of the Medium Access Control (MAC) protocol is to allocate channel resources, typically radio channel resources. The MAC protocol defines how and when an access point or a subscriber unit may transmit on the channel. The MAC protocol includes required procedures for interfaces to provide guaranteed services to upper protocol layers.

In a centrally controlled access system, the access point is responsible for allocating capacity to subscriber stations on the uplink channel, i.e. for deciding when and for how long each subscriber station is allowed to transmit on the channel. The access point typically announces its scheduling decisions by transmitting control messages, sometimes called maps, which typically are broadcasted to all subscriber stations. These messages usually include a list of information elements, each one defining a capacity grant, specified i.e. by a starting time and a time frame for a transmission, addressed to a specific entity defined by the protocol.

For the end user the most important thing in communication networks is naturally that he can be satisfied with the end-to-end services he uses. An end-to-end service sets requirements regarding the Quality of Service (QoS). The requirements are mapped to the protocol hierarchy levels. For enabling a mapping between different hierarchy levels, the QoS requirements are usually classified.

The QoS requirements have to be fulfilled connection-specific. However, in centrally controlled access systems capacity is typically granted subscriber station-specific. Additionally, it should be noted that in many cases, one subscriber station may have several connections simultaneously. These connections may originate from more than one user equipment, and they have a defined QoS, which may be different for each connection. Thus there is a problem as to how the QoS requirements can be fulfilled for each connection.

SUMMARY OF THE INVENTION

The invention provides an improved data transmission method, a system, a base station, a subscriber station, a data processing unit, a computer program product, a computer program distribution medium, and a baseband module. According to an embodiment of the invention, there is provided a data transmission method in a communication system, the system including at least one base station and at least one subscriber station, which subscriber station allocates capacity for connections. The method includes first transmitting from a subscriber station at least one capacity request message, granting a capacity subscriber station-specific by a base station, second transmitting at least one capacity grant message from the base station, allocating granted capacity connection-specific by the subscriber station, third transmitting from the subscriber station at least one message wherein the at least one message includes information based on previous capacity requests, fourth transmitting data from the subscriber station according to a capacity allocation, and monitoring by the base station on capacity request messages, capacity grant messages and received transmissions.

According to another embodiment of the invention, there is provided a data transmission method in a communication system. The system includes at least one base station and at least one subscriber station, which subscriber station allocates capacity for connections. The method includes the steps of first: determining communication groups, second determining a group priority order, first transmitting at least one capacity request message from a subscriber station, granting a capacity subscriber station-specific by a base station, second transmitting at least one capacity grant message from the base station, scheduling connections by the subscriber station based on the communication groups, group priority order and granted capacity, third transmitting from the subscriber station at least one message, wherein the at least one message includes information based on previous capacity requests, fourth transmitting data from the subscriber station, wherein the data is related to a connection scheduling, and monitoring by the base station of at least one of capacity request messages, capacity grant messages and received transmissions.

According to another embodiment of the invention, there is provided a communication system. The system includes: means for first transmitting capacity request messages, granting means for granting a capacity subscriber station-specific, second transmitting means for transmitting capacity grant messages, allocating means for allocating granted capacity connection-specific, third transmitting means for transmitting messages, wherein the messages include information based on previous capacity requests, fourth transmitting means for transmitting data according to the capacity allocation made by a subscriber station, and monitoring means for monitoring at least one of the request messages, the capacity grant messages and the received transmissions.

According to another embodiment of the invention, there is provided a communication system, the system including: grouping means for grouping the connections into predetermined communication groups, first transmitting means for transmitting capacity request messages, granting means for granting capacity subscriber station-specific, second transmitting means for transmitting capacity grant messages, scheduling means for scheduling connections on the basis of the communication groups, a predetermined group priority order and the granted capacity, third transmitting means for transmitting messages, wherein the messages include information on previous capacity requests, fourth transmitting means for transmitting data according to a connection scheduling, and monitoring means for monitoring at least one of the request messages, capacity grant messages and received transmissions.

According to another embodiment of the invention, there is provided a base station of a communication system, the base station including: granting means for granting transmission capacity subscriber station-specific, transmitting means for transmitting capacity grant messages to at least one subscriber station, and monitoring means for monitoring capacity request messages received from the subscriber stations, capacity grant messages sent by the base station and data transmissions received from the at least one subscriber station.

According to another embodiment of the invention, there is provided a subscriber station of a communication system, wherein the subscriber station allocates capacity for connections, the subscriber station including: first transmitting means for transmitting capacity request messages of at least one connection, receiving means for receiving capacity grant messages from a base station, allocating means for allocating connection-specific the capacity granted by the base station, second transmitting means for transmitting messages, wherein the messages include information based on previous capacity requests of the subscriber station, and third transmitting means for transmitting data according to the capacity allocation made by the subscriber station.

According to another embodiment of the invention, wherein is provided the subscriber station of a communication system which subscriber station allocates capacity for connections, the subscriber station including: means for transmitting capacity request messages of one or more connection, means for grouping the connections into predetermined communication groups, means for scheduling the connections on the basis of the communication groups, a predetermined group priority order and the capacity granted by a base station, means for transmitting messages which messages comprise information on previous capacity requests, means for transmitting data according to a connection scheduling.

According to another embodiment of the invention, there is provided a base station of a communication system configured to receive capacity request messages from one or more subscriber stations, grant transmission capacity subscriber station-specific, transmit capacity grant messages to one or more subscriber station, monitoring request messages received from the subscriber stations, capacity grant messages sent by the base station and data transmissions received from the subscriber stations.

According to another embodiment of the invention, there is provided a subscriber station of a communication system which subscriber station allocates capacity for connections, configured to transmit capacity request messages of one or more connections, allocate connection-specific the capacity granted by a base station, transmit messages which messages comprise information on previous capacity requests, transmit data from the subscriber station according to the capacity allocation made by the subscriber station.

According to another embodiment of the invention, there is provided a data transmission method. The method includes receiving capacity request messages; granting capacity subscriber station-specifically; transmitting at least one capacity grant message; and monitoring at least one of capacity request messages, capacity grant messages and received transmissions.

According to another embodiment of the invention, there is provided a data transmission method. The method includes transmitting capacity request messages of at least one connection; receiving capacity grant messages from a base station; connection-specifically allocating the capacity granted by the base station; transmitting messages, wherein the messages comprise information based on previous capacity requests; and transmitting data according to the capacity allocation.

According to another embodiment of the invention, there is provided a data transmission method. The method includes transmitting capacity request messages of at least one connection; grouping connections into predetermined communication groups; scheduling the connections based on the predetermined communication groups, a predetermined group priority order and a capacity granted by a base station; transmitting messages, wherein the messages comprise information based on previous capacity requests; and transmitting data according to a connection scheduling.

According to another embodiment of the invention, there is provided a data processing unit. The unit includes: means for receiving capacity request messages; means for granting capacity subscriber station-specifically based on the received capacity request messages; means for generating at least one capacity grant message; and means for monitoring at least one of capacity request messages, capacity grant messages and received transmissions.

According to another embodiment of the invention, there is provided a data processing method. The method includes receiving capacity request messages; granting capacity subscriber station-specifically based on the received capacity request messages; generating at least one capacity grant message; and monitoring at least one of capacity request messages, capacity grant messages and received transmissions.

According to another embodiment of the invention, there is provided a data processing unit. The unit includes: means for generating capacity request messages of at least one connection; means for receiving capacity grant messages; means for connection-specifically allocating the capacity granted in the received capacity grant messages; and means for generating messages, wherein the messages comprise information based on previous capacity requests.

According to another embodiment of the invention, there is provided a data processing method. The method includes generating capacity request messages of at least one connection; receiving capacity grant messages; connection-specifically allocating the capacity granted in the received capacity grant messages; and generating messages, wherein the messages comprise information based on previous capacity requests.

According to another embodiment of the invention, there is provided a data processing unit. The unit includes: means for transmitting capacity request messages of at least one connection; means for grouping connections into predetermined communication groups; means for scheduling the connections based on the predetermined communication groups, a predetermined group priority order and a capacity granted by a base station; means for transmitting messages, wherein the messages comprise information based on previous capacity requests; and means for transmit-ting data according to a connection scheduling.

According to another embodiment of the invention, there is provided a computer program product encoding a computer program of instructions for executing a computer process for a data transmission method. The process includes receiving capacity request messages; granting capacity subscriber station-specifically; generating at least one capacity grant message; and monitoring at least one of capacity request messages, capacity grant messages and received transmissions.

According to another embodiment of the invention, there is provided a computer program distribution medium readable by a computer and encoding a computer program of instructions for executing a computer process for a data transmission method. The process includes receiving capacity request messages; granting capacity subscriber station-specifically; generating at least one capacity grant message; and monitoring at least one of capacity request messages, capacity grant messages and received transmissions.

According to another embodiment of the invention, there is provided a computer program product encoding a computer program of instructions for executing a computer process for a data transmission method. The process includes generating capacity request messages of at least one connection; receiving capacity grant messages; connection-specifically allocating the capacity granted in the capacity grant messages; and generating messages, wherein the messages comprise information based on previous capacity requests.

According to another embodiment of the invention, there is provided a computer program product encoding a computer program of instructions for executing a computer process for a data transmission method. The process includes transmitting capacity request messages of at least one connection; grouping connections into predetermined communication groups; scheduling the connections based on the predetermined communication groups, a predetermined group priority order and a capacity granted by a base station; transmitting messages, wherein the messages comprise information based on previous capacity requests; and transmitting data according to a connection scheduling.

According to another embodiment of the invention, there is provided a computer program distribution medium readable by a computer and encoding a computer program of instructions for executing a computer process for a data transmission method. The process includes generating capacity request messages of at least one connection; receiving capacity grant messages; connection-specifically allocating the capacity granted in the capacity grant messages; and generating messages, wherein the messages comprise information based on previous capacity requests.

According to another embodiment of the invention, there is provided a computer program distribution medium readable by a computer and encoding a computer program of instructions for executing a computer process for a data transmission method. The process includes transmitting capacity request messages of at least one connection; grouping connections into predetermined communication groups; scheduling the connections based on the predetermined communication groups, a predetermined group priority order and a capacity granted by a base station; transmitting messages, wherein the messages comprise information based on previous capacity requests; and transmitting data according to a connection scheduling.

According to another embodiment of the invention, there is provided a baseband module. The module includes: means for receiving capacity request messages; means for granting capacity subscriber station-specifically based on capacity request messages; means for generating at least one capacity grant message; means for monitoring at least one of capacity request messages, capacity grant messages and received transmissions According to another embodiment of the invention, there is provided a baseband module. The module includes: means for generating capacity request messages of at least one connection; means for receiving capacity grant messages; means for connection-specifically allocating the capacity granted in the capacity grant messages; and means for generating messages, wherein the messages comprise information based on previous capacity requests.

According to another embodiment of the invention, there is provided a baseband module. The module includes: means for transmitting capacity request messages of at least one connection; means for grouping connections into predetermined communication groups; means for scheduling the connections based on the predetermined communication groups, a predetermined group priority order and a capacity granted by a base station; means for transmitting messages, wherein the messages comprise information based on previous capacity requests; and means for transmit-ting data according to a connection scheduling.

The method and system of the invention provide several advantages. In an embodiment of the invention QoS requirements can be fulfilled connection-specific. Another advantage is that a base station can control the amount of data transmission in comparison with data requests in order to avoid a mis-match between the capacity the base station has granted and the data it has received.

BRIEF DESCRIPTION OF THE DRAWINGS

In the following, the invention will be described in greater detail with reference to the embodiments of the invention and the accompanying drawings, in which FIG. 1 shows an example of a transmission system according to an embodiment of the invention;

FIGS. 2A-B illustrate prior art examples of GPSS (grant per subscriber station) operation;

DETAILED DESCRIPTION OF THE PREFERRED EMBODIMEMTS

Figure 3:
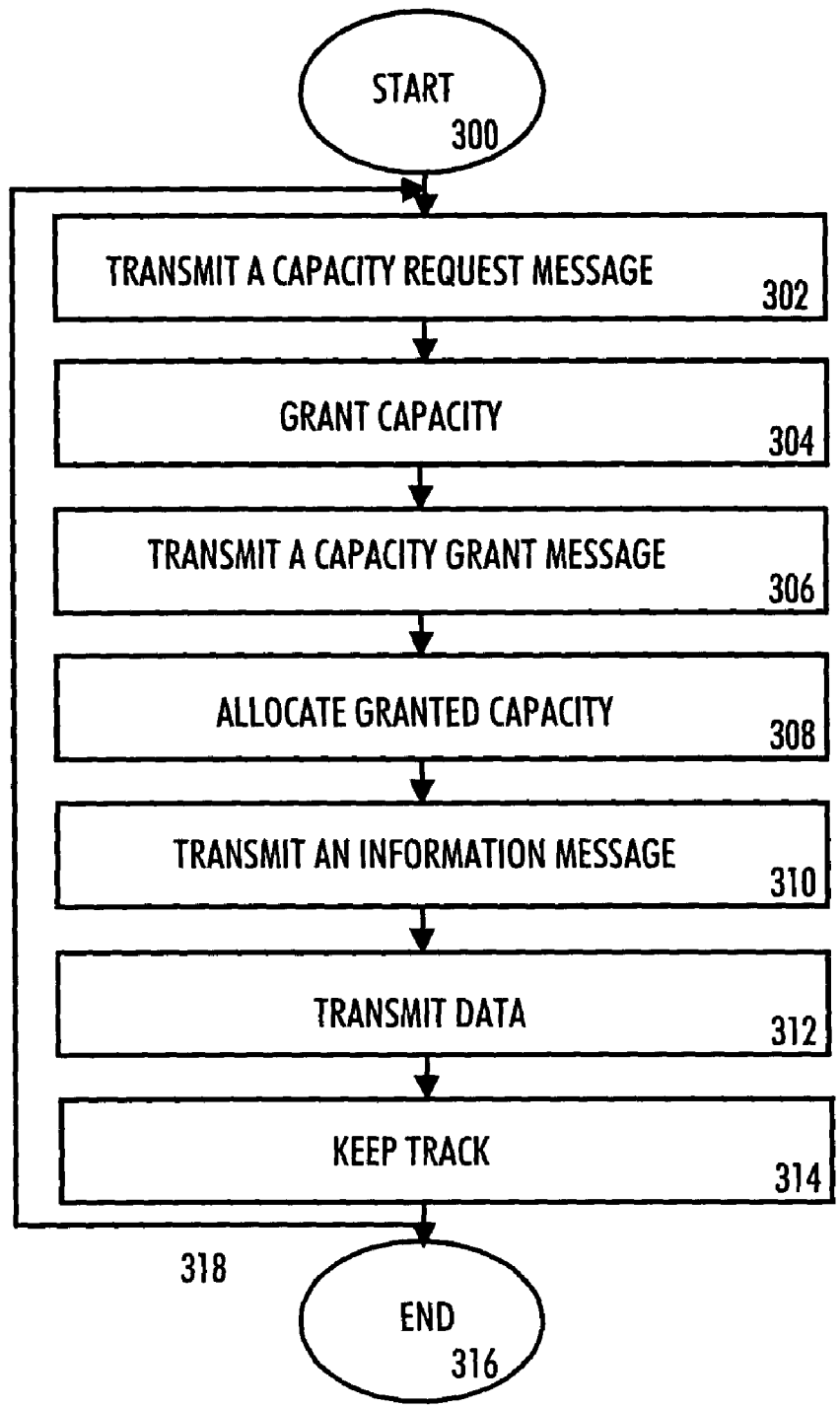
FIG. 3 is a flow chart of a data transmission method according to an embodiment of the invention.

With reference to FIG. 1, a simplified example of a data transmission system, in which the embodiments of the invention can be applied, is shown. FIG. 1 is a simplified illustration of a digital data transmission system where the solution according to the invention is applicable. FIG. 1 shows part of a communication system that includes a base station (BS) 102, which has a bi-directional radio link 100 to a subscriber station 104. The subscriber station (SS) is a generalized equipment set providing connectivity between user terminals and a base station. A subscriber station is usually a fixed network element as well as a base station. The connection between a subscriber station and a user terminal may include intermediate network elements, which, are not necessary to understanding and describing the invention, are not shown.

An example of an environment the system according to FIG. 1 can be applied to is an office building wherein a subscriber station is typically located on the rooftop of the office building and user terminals have connections to a base station via the subscriber station. The subscriber station in FIG. 1 has bi-directional 110, 112 links to user terminals 106, 108. These links can be radio links or implemented as fixed links. From the transceivers of the subscriber station there is a connection to an antenna unit, which establishes the bi-directional radio link 100. One exemplary system where the arrangement according to FIG. 1 is used is a Fixed Broad Band Wireless Access System (802.16 standard), which can provide wireless high-data-rate connections. In practice, systems typically include a plurality of subscriber stations that communicate with each base station. This is called a point-to-multipoint topology. The user terminal can be portable or fixed.

The base station is connected via a connection 114 to a backbone network 116. Backbone-concept means a primary connectivity structure of a hierarchical distributed system, in which all systems with connectivity to an intermediate system are assured of connectivity to each other. A backbone network in this example can be for instance an IP-network (Internet). Typically, different networks are connected to each other with a router 118. A router is a device that forwards packets from one network to another on the basis of network-layer information and a routing table.

In this application the invention is explained with the aid of examples shown in a communication system according to the Fixed Broadband Wireless Access Systems standard. These examples do not restrict the applicability of the embodiments of the invention to the Fixed Broadband Wireless Access Systems standard but the invention can be applied to any system having the required requisite.

FIG. 2A shows a prior art example of GPSS (grant per subscriber station) operation. The system includes a subscriber station $SS_i$ and a base station BS. The subscriber station has two resource requests for two separate connections A 202A and B 204B. These connections may represent connections of a single user terminal, or two connections of a single user terminal with different quality requirements. The subscriber station sends a capacity request 206A of 300 bytes for the first connection and a capacity request 208A of 500 bytes for the second connection. First, the base station decides to allocate the second connection B 250 bytes 210 and sends a grant message 212A to the subscriber station. The subscriber station decides to schedule the granted capacity differently: first it allocates 250 bytes to the first connection A. The first connection still needs 50 bytes more, which is marked on FIG. 2A by number 214. The second connection still needs all of the 500 bytes requested. The subscriber station transmits the first connection's data to the base station 216.

As can be seen in FIG. 2A, there is a mismatch between the capacity grant and the sent data: the base station granted resources for the first connection but the subscriber station allocated the resources to the second connection. However, as long as the total amount of bandwidth required by the $SS_i$ corresponds the total amount of bandwidth granted by the base station, no bad deadlock situations typically arises.

FIG. 2B shows another prior art example of GPSS operation. The system includes a subscriber station $SS_i$ and a base station BS. The subscriber station has two resource requests for two separate connections A 202B and B 204B. The subscriber station sends a capacity request of the first connection A of 300 bytes 206B and a capacity request of the second connection B of 500 bytes 208B. However, the base station never receives the capacity request message 208B and thus decides to allocate 250 bytes to the first connection A and sends a capacity grant message 212B. In FIG. 2B, the capacity request messages received by the base station are marked with numbers 220 and 222. The capacity grant decisions made by the base station are marked with numbers 224 and 226.

Since the subscriber station decides to allocate the granted capacity to the connection B, marked in FIG. 2B with a number 218, and sends to the base station a data message 228 having the data of connection B, there is a mismatch between the capacity granted by the base station and the data it has received.

FIG. 3 is a flow chart, with which an embodiment of the invention is explained. The embodiment is a method of scheduling transmission of packets from different connections in a granted uplink transmission interval. The embodiment introduces a method of attenuating or even eliminating disadvantages brought by the mismatch problem. The method can be called a three-way handshake. The three-way handshake is especially suitable for systems, where the capacity is requested connection-specific and the capacity is granted subscriber station-specific and where the capacity requests can get lost.

The communication system where the method can be implemented includes at least one subscriber station and at least one base station. The subscriber station (SS) is a generalized equipment set providing connectivity between a user terminal and a base station. The user terminal can be portable, fixed or mounted in a vehicle. The base station has a connection to all subscriber stations under its control. The base station checks the addresses in the received messages and retain only the addresses of the received messages. In the uplink, the subscriber stations share the radio resources based on capacity demand. This resource sharing may be according to a burst-mode FDD (Frequency Division Duplex) system, where each subscriber station can transmit during defined time periods granted by the base station, for example. Alternatively, the resource sharing can be implemented as a conventional FDD, a TDD (Time Division Duplex) or CDD (Code Division Duplex) system, or as a combination of these.

The system preferably uses a centrally controlled access system where the access point (a base station, for instance) is responsible for allocating capacity to subscriber stations on the uplink channel, i.e. for deciding when and for how long the subscriber station is allowed to transmit on the channel. The MAC protocol is one of the upper layer protocols, which is used for this purpose.

The method starts from block 300. In block 302 at least one capacity request message is transmitted by a subscriber station connection-specific. Preferably, a capacity request message is transmitted by a subscriber station for each connection having data to be transmitted. A combined capacity request message, where multiple requests are combined into a single capacity request message is also applicable. A request message type is typically defined by the standard used. It should be noticed that the capacity request messages may get lost due to collisions with transmissions from other subscriber stations, for example.

In block 304 capacity is granted by the base station. The base station makes the decision on the capacity grant on the grounds of the received capacity requests, which may arrive from several subscriber stations. However, the base station is not obliged to grant as much capacity as requested, but it can make a divergent decision instead. A typical situation is that subscriber stations need more capacity for the connections than is available at the moment and the base station divides the available capacity between different subscriber stations according to an algorithm, which is based on the priority of transmissions, for example.

In block 306 at least one capacity grant message is transmitted by the base station. A grant message type is typically defined by the standard used.

In block 308 the granted capacity is allocated by the subscriber station. The capacity is allocated connection-specific. A subscriber station can allocate or schedule to the connections the radio capacity the base station has granted independently from the decision of the base station.

In block 310 at least one message including information on previous capacity requests is transmitted. This makes it possible for the base station to update its information on the capacity requests in comparison with received transmissions. The information is, for instance, the amount of previously requested bandwidth connection-specific.

In block 312 the subscriber station transmits data to the base station according to the capacity allocation decision made by the subscriber station.

Figure 4:
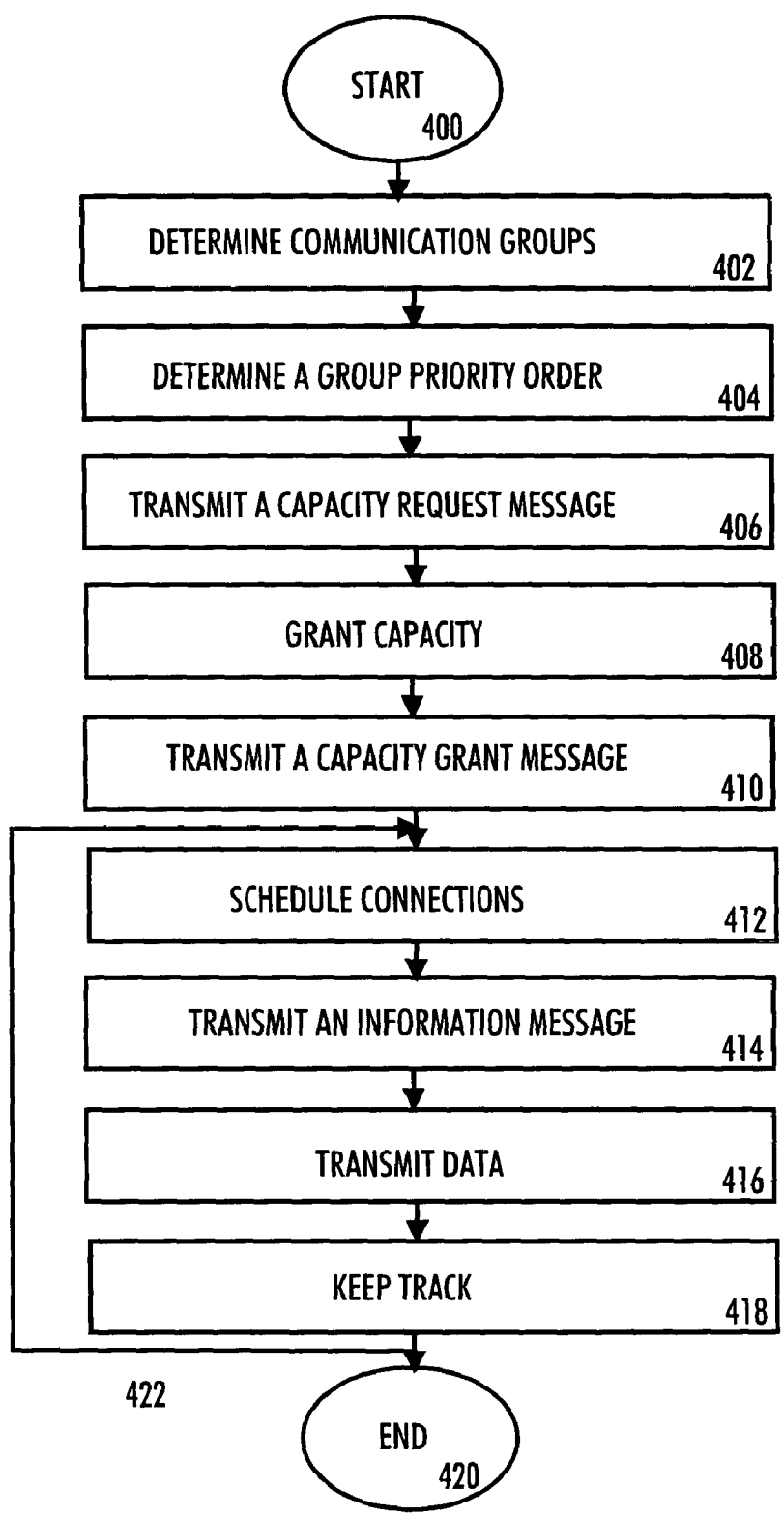
FIG. 4 is another flow chart of a data transmission method according to an embodiment of the invention.
Figure 5:
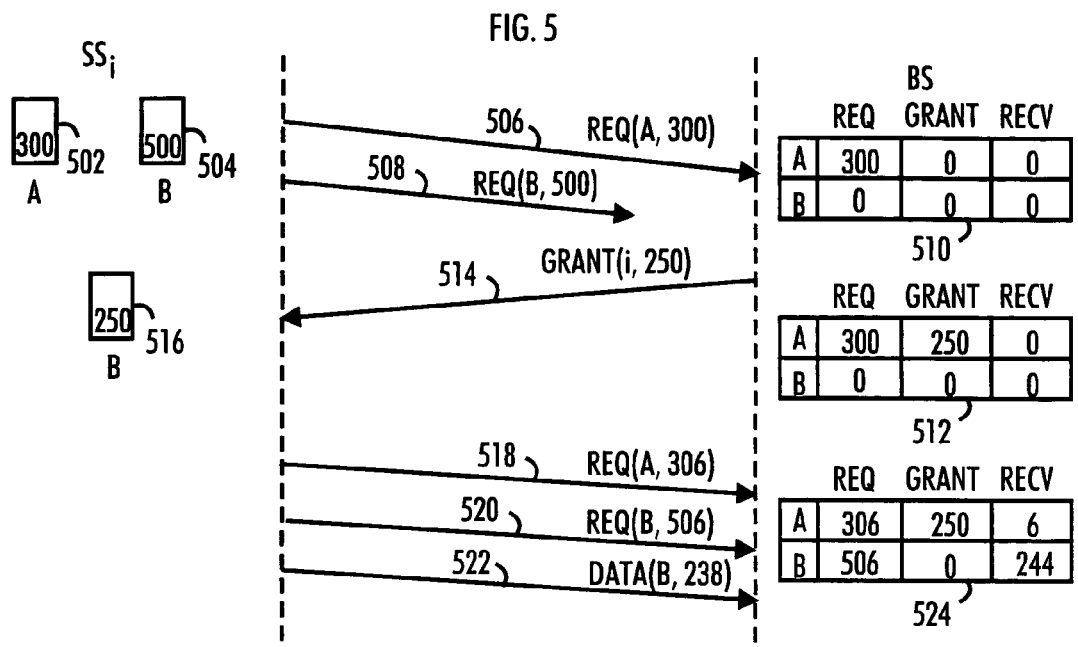
FIG. 5 shows an example of operation of a subscriber station and a base station according to an embodiment of the invention.

In block 314 the base station monitors and stores the capacity request messages, capacity grant messages and received transmissions. The base station uses information on the request messages, capacity grant messages and received transmissions for avoiding mismatch between the granted capacity and the data received from the subscriber station, This as well as the role of the subscriber station is explained in further detail with the aid of FIG. 5. FIG. 5 is explicated in connection with FIG. 4.

The method ends in block 316. The arrow 318 depicts one possibility of repeating the method.

In the following, another embodiment of the three-way handshake method is described with the aid of FIG. 4.

The method starts from block 400. In block 402 communication groups are determined. One uplink scheduling service standard is used as an example here, but for a person skilled in the art it is obvious that this example does not restrict the application of the method in any way.

Generally speaking, scheduling services are designed to improve the efficiency of the poll/grant process. By specifying a scheduling service and its associated QoS parameters, the base station can anticipate the throughput and latency needs of the uplink traffic and provide polls and/or grants at the appropriate times. The basic services in this example, as defined in the exemplary IEEE 802.16 standard, are Unsolicited Grant Service (UGS), Real-Time Polling Service (rtPS), Non-Real-Time Polling Service (nrtPS) and Best Effort (BE) service. Each service is intended for a specific type of data flow.

The Unsolicited Grant Service (UGS) is designed to support real-time service flows that generate fixed size data packets on a periodic basis, such as Voice over IP without silence suppression. The service offers fixed size grants on a real-time periodic basis, which eliminate the overhead and latency of SS requests and assure that grants are available to meet the flow's real-time needs.

The Real-Time Polling Service (rtPS) is designed to support real-time service flows that generate variable size data packets on a periodic basis, such as MPEG video. The service offers real-time, periodic, unicast request opportunities, which meet the flow's real-time needs and allow the SS to specify the size of the desired grant. This service requires more request overhead than the UGS, but supports variable grant sizes for optimum data transport efficiency.

The Non-Real-Time Polling Service (nrtPS) is designed to support non real-time service flows that require variable size data Grant Burst Types on a regular basis, such as high bandwidth FTP (File Transfer Protocol). The service offers unicast polls on a regular basis which assures that the flow receives request opportunities even during network congestion.

The intent of the Best Effort (BE) service is to provide efficient service for the best effort traffic. In order for this service to work correctly, the Request/Transmission Policy setting should be such that the subscriber station is allowed to use contention request opportunities.

In the example used here, the communication groups are determined on the basis of the basic services presented above.

More details about scheduling services can be found in the literature and standards of the field.

In block 404 a group priority order is determined. The priority order can be determined on the basis of the previously determined communication groups or the order can be determined independently. In most cases, the most straightforward solution is that the order is determined on the basis of the groups themselves, especially when the groups are QoS-groups, because in that case the priority order is determined in the used standard.

In block 406 at least one capacity request message is transmitted by a subscriber station connection-specific. In the current example, a separate capacity request message is transmitted from the subscriber station for each connection having data to be transmitted. A request message type is typically defined by the used standard and can thus differ from the depicted example. It should be noticed that capacity request messages may get lost due to collisions with transmissions from other subscriber stations.

In block 408 capacity is granted by a base station. A base station makes the decision on the capacity grant on the grounds of arrived capacity requests. However, a base station is not obliged to grant as much capacity as requested, but it can make a divergent decision. A typical situation is that subscribers need more capacity than is available at the moment and a base station divides the free capacity between different connections according to some algorithm, which is specific for example on the priority of transmissions.

In block 410 at least one capacity grant message is transmitted by a base station. A grant message type is typically defined by the standard used.

In block 412 connections are scheduled by a subscriber station on the basis of the communication groups, group priority order and granted capacity.

A subscriber station can allocate or schedule the radio capacity a base station has granted independently from the decision of a base station.

In block 414 at least one message including information on previous capacity requests is transmitted. The information is, for instance, the number of previously requested bandwidths connection-specific.

The function of a subscriber station, as well as the method of the invention (in other words blocks 412 and 414 and also relatively blocks 308 and 310 in FIG. 3) is explained by the aid of the example shown in FIG. 5. The number of messages, the amount of bytes, as well as other analogous details marked in FIG. 5, are only examples and they do not restrict the application of the method in any way.

The subscriber station $SS_i$ has two resource requests for two separate connections 502, 504. The subscriber station sends a capacity request message 506 of the first connection A of 300 bytes and a capacity request message 508 of the second connection B of 500 bytes. The capacity request messages also include a connection identifier so that the base station can recognize different connections. The base station does not, however, receive the second request message and therefore the base station decides to allocate the first connection 250 bytes and sends a capacity grant message 514 to the subscriber station. The subscriber station decides to allocate the granted capacity differently: first, it allocates the second connection B 250 bytes. The second connection still needs 250 bytes more, which is marked on the figure by number 516.

Next, the subscriber station transmits new aggregate request messages. The number of messages varies according to the situation. Usually the subscriber station transmits as many aggregate request messages as there are connections needing capacity. An aggregate request message carries an update, which replaces the information on the bandwidth needs of the connection at the base station. In FIG. 5 the first (connection A) aggregate request message (aggregate PDU, Protocol Data Unit) is marked with number 518 and the second (connection B) is marked with number 520. Since a subscriber station scheduler is aware of the status of the uplink buffers, the backlog can be given to a base station using an aggregate PDU. The length of a PDU is typically 6 bytes.

As can be seen in FIG. 5, the bytes needed for identifiers or headers are included in the capacity granted and thus there is slightly less capacity available for actual data. Nevertheless, the difference is not considerable and the attained benefit is remarkable, as can be seen next.

In block 416 the subscriber station transmits data to the base station according to a connection scheduling (or allocation) made by the subscriber station. In the example of FIG. 5, this is marked by a message 522.

In block 418 (block 314 in FIG. 3), the base station monitors and stores the request messages, capacity grant messages and received transmissions. The base station uses information on the request messages, capacity grant messages and received transmissions for avoiding mismatch between the granted capacity and the data received from a subscriber station.

This is also explained in further detail with the aid of FIG. 5. The first table 510 shows the bookkeeping of the follow-up after the base station has received the first capacity request message 506. As can be seen, the base station did not receive the second capacity request message 508.

The second table 512 shows that the base station grants 250 bytes for the first connection (connection A). The third table 524 depicts the situation after aggregate request messages: requests for both connections are updated to the current situation as well as received messages. This is how a base station can monitor the requests, grants and transmissions and the probability of a mismatch (see FIGS. 2A-B) is smaller and can usually be avoided. The base station typically saves in the memory the current situation concerning capacity requests for each connection, granted capacity for each connection and data received from each connection. The bookkeeping is beneficial in many situations: when a capacity request never reaches the base station or the subscriber station allocates, for some reason, the capacity differently from the grant decision made by the base station.

It is obvious for a person skilled in the art that there are also other possibilities of implementing the monitoring and storing features, but a memory table is quite an advantageous solution.

The method ends in block 420. Arrow 422 depicts one possibility of repeating the method.

Figure 6:
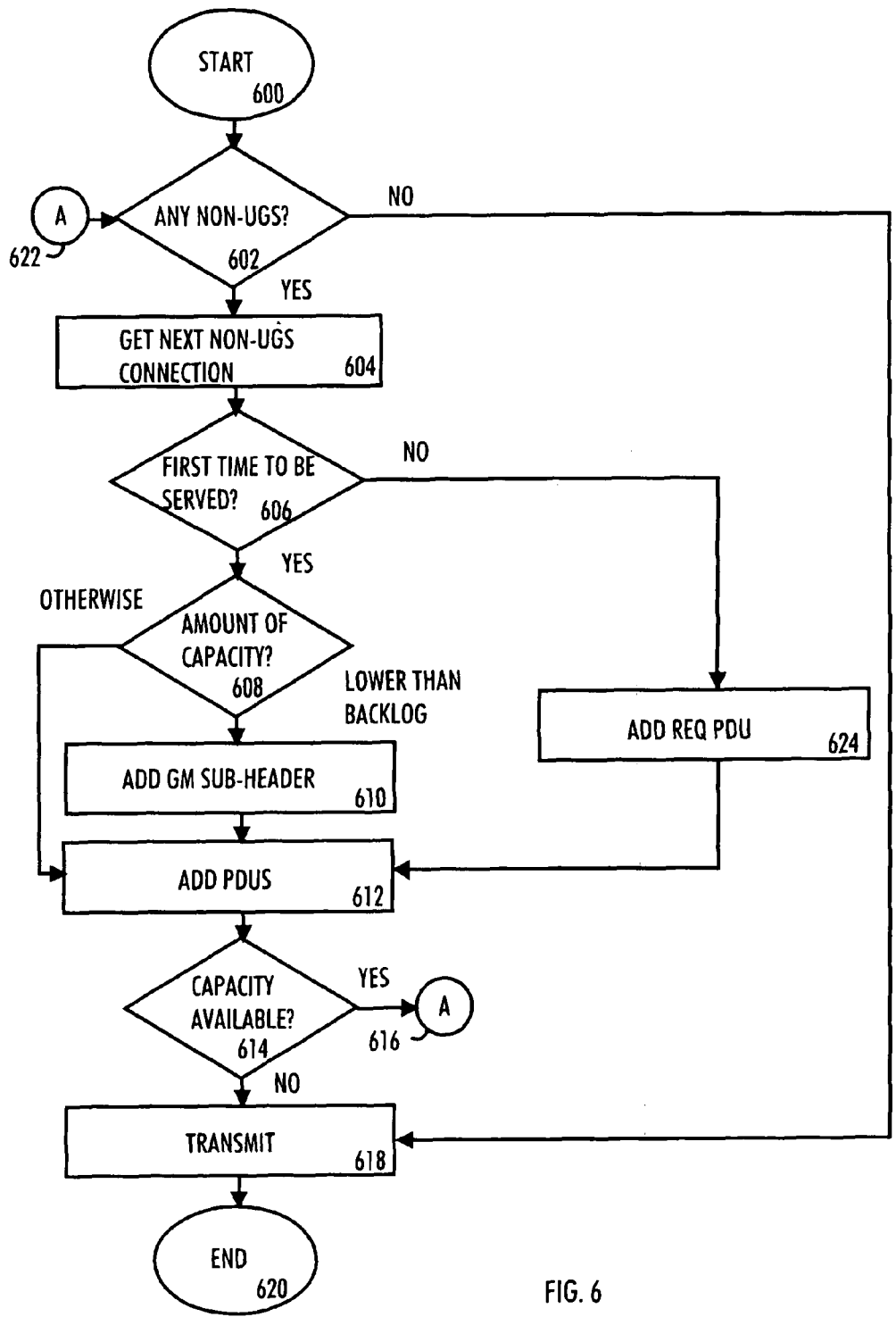
FIG. 6 shows an example of processing of non-UGS service class according to an embodiment of the invention.

In the following, a more detailed example of one embodiment of the three-way handshake method is explained according to FIG. 6. FIG. 6 depicts an example of processing non-UGS connections, in other words Real-Time Polling Service (rtPS), Non-Real-Time Polling Service (nrtPS) and Best Effort (BE) service connections.

The process starts from block 600. In block 602 it is searched if there are non-UGS connections waiting in a buffer. It is assumed that the connection grant implicitly acknowledges the reception at the base station of bandwidth requests depicted by a PDU header previously transmitted.

If the buffer is not empty, a non-UGS connection is selected from the queue in block 604. Typically, the principle how connections are picked from the queue is a Weighted Round Robin order (WRR). A Round Robin algorithm is a cyclical multiplexing technique, which is often used in allocating resources in fixed-size time slices.

Deficit Round Robin algorithm is a variation of the weighted Round Robin (WRR) that allows connections with variable packet lengths to share the link bandwidth. Packet-specific implementations are usually suggested to avoid fragmentation. In a Deficit Round Robin algorithm, each connection is characterized by the quantity of packets that the connection should ideally transmit during a round $\phi$ and a deficit variable $\Delta$. When a backlogged connection is serviced, it is allowed to transmit a burst of packets of an overall length not exceeding $\phi+\Delta$. When a connection is unable to send a packet in a round because the packet is too large, the bytes which could not be used for transmission in the current round are saved in the connection's deficit variable, and are therefore available to the same connection in the next round.

In block 606 it is clarified if the connection is served for the first time. If the connection in question has been served earlier, the process continues in block 624 and 612. In block 624 an update aggregate request message is added to the burst, which replaces the information on the bandwidth needs of the connection at the base station.

Otherwise, the process continues in block 608. In block 608, a query is made to determine if the requested capacity is lower than the current backlog. If it is, a GM (Grant Management) sub-header is added to the first PDU with an incremental request in block 610. A GM sub-header is a special request message that is embedded in a data-PDU. It carries an incremental request, in other words, a request that is added to the previous ones. A request message can also be used, but GM sub-headers are more preferable since they are shorter than request messages. Attention should be paid to the fact that GM sub-headers can not always be used since they are a specific facility of the 802.16 standard.

In block 612 one or more PDU are added to a burst according to a Round Robin algorithm.

Next it is determined whether there is still capacity available, block 614. If there is no longer enough capacity, the processed burst is transmitted in block 618. If there still is capacity, the process begins again, which is marked in FIG. 6 by two blocks containing the A 616, 622. The process ends in block 620.

Figure 7:
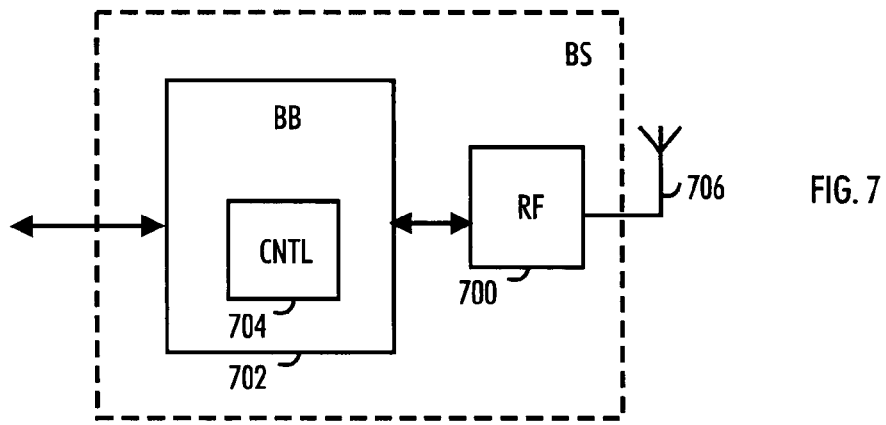
FIG. 7 shows an example of a base station according to an embodiment of the invention.

FIG. 7 illustrates a simplified exemplary embodiment of a base station in relation to the functionalities required by the three-way handshake method described above. It is obvious to a person skilled in the art that the base station can deviate from what is depicted in FIG. 7.

In this case RF parts 700 are common for both a receiver and a transmitter of the base station. It is obvious that they can also be separate components. The RF parts may also comprise a power amplifier, which amplifies a received signal that has been attenuated in a radio path. Typically the RF parts of a receiver down-convert the received signal to an intermediate frequency and then to a base band frequency or straight to the base band frequency. In a transmitter the signal is up-converted to a carrier frequency. In digital systems the RF parts typically include an analog-to-digital/digital-to-analog converter.

From the RF-parts there is a connection to an antenna 706. The transceiver uses the same antenna 706 for receiving and transmitting and therefore there is also a duplex filter to separate transmission and reception. The antenna may be an antenna array or a single antenna. Various other radio frequency functionalities, such as modulating/demodulating and error correction may be included in the RF part of the unit. The antenna may be an antenna array or a single antenna.

In the exemplary solution of FIG. 7 additional functions of the base station are placed in a base band, BB, block 702 that is usually implemented as an ASIC (Application Specific Integrated Circuit) component. The base band block takes care of for instance, digital signal processing (DSP) functions, like coding and decoding, if required. Also modulation and demodulation can be transacted in the base band block. The base band block may include a DSP-block for DSP-processing and/or a CPU-block (central processing unit).

In one embodiment of the invention, The BB-block contains a memory unit or it is connected to one. The memory unit is used for keeping track of the request messages, the capacity grant messages and the received transmissions. The information can be stored, for instance, in a table format. Also capacity grant functions are carried out by the BB-block.

The control block 704 that, in this example, is part of the base band block carries out controlling the capacity grant process, the transmitting of capacity grant messages and track-keeping on request messages, capacity grant messages and received transmissions.

Figure 8:
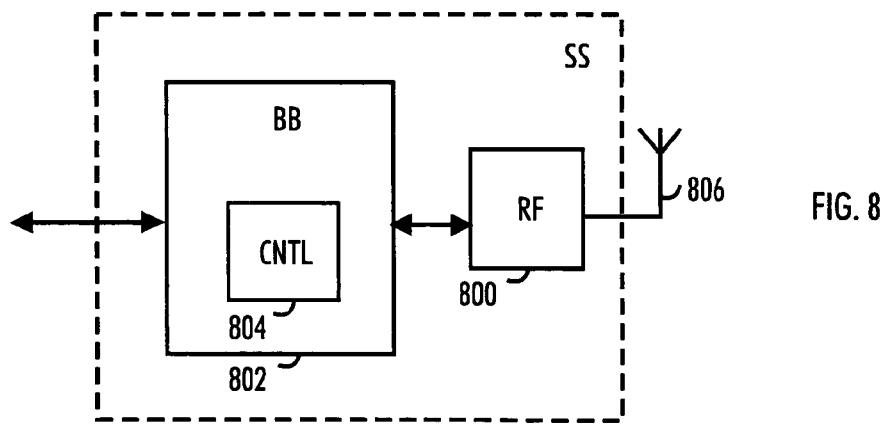
FIG. 8 shows an example of a subscriber station according to an embodiment of the invention.

FIG. 8 illustrates a simplified exemplary embodiment of a subscriber station in relation to the functionalities required by the three-way handshake method described above. It is obvious to a person skilled in the art that the subscriber station can deviate from what is depicted in FIG. 8. In this case RF parts 800 are common for both a receiver and a transmitter of the subscriber station. It is obvious that they can also be separate components. The RF parts may also include a power amplifier, which amplifies a received signal that has been attenuated in a radio path. Typically the RF parts of a receiver down-convert the received signal to an intermediate frequency and then to a base band frequency or straight to the base band frequency. In a transmitter the signal is up-converted to a carrier frequency. In digital systems, the RF parts typically include an analog-to-digital/digital-to-analog converter.

From the RF-parts there is a connection to an antenna 806. The transceiver uses the same antenna 806 for receiving and transmitting and therefore there is also a duplex filter to separate transmission and reception. The antenna may be an antenna array or a single antenna. In a point-to-multipoint solution, such as the exemplary IEEE 802.16 standard, the subscriber station antenna may be a beam-forming antenna.

In the solution of FIG. 8 additional functions of the subscriber station are placed in a base band, BB, block 802 that is usually implemented by an ASIC (Application Specific Integrated Circuit) component. The base band block takes care of for instance, DSP functions required.

In one embodiment of the invention, the control block 804 that, in this example, is part of the base band block carries out the function of controlling the transmission of the capacity request messages, the transmission of messages including information on previous capacity requests and the transmission of data according to a capacity allocation. The control block also allocates to different connections the capacity a base station has granted. A subscriber station scheduler, which typically schedules connections on the basis of service classes, is preferably part of the control block.

The base station and the subscriber station are connected to each other typically via a radio connection for transmitting messages and data.

The disclosed functionalities of the described embodiments of the data transmission method can be advantageously implemented by means of software located typically in the Digital Signal Processor or in the central processing unit, which both may be situated in the base band parts of a base station and in the base band parts of a subscriber station. The implementation solution can also be for instance an ASIC (Application Specific Integrated Circuit) component. A hybrid of these different implementations is also feasible.

Even though the invention is described above with reference to an example according to the accompanying drawings, it is clear that the invention is not restricted thereto but it can be modified in several ways within the scope of the appended claims.

The invention claimed is:

1. An apparatus, comprising:
at least one processor;
at least one memory containing executable instructions which when executed performs operations comprising:
receiving at least one of a plurality of capacity request messages from a subscriber station;
granting a transmission capacity to the subscriber station;
transmitting a capacity grant message to the subscriber station;
monitoring the at least one of the plurality of capacity request messages received from the subscriber station, the capacity grant message sent by a base station, and a data transmission received from the subscriber station,
wherein the at least one of the capacity request messages comprises an aggregate capacity request message comprising information based on a previous capacity request message sent by the subscriber station; and
determining whether a mismatch exists between the granted transmission capacity and the data transmission received from the subscriber station based on information included in the aggregate capacity request message received from the subscriber station, the capacity grant message sent to the subscriber station, and the data transmission received from the subscriber station.

2. The apparatus of claim 1, wherein the monitoring is based on messages and transmissions using a memory table.

3. The apparatus of claim 1, further comprising:
transmitting an updated capacity request message comprising information based on a previous capacity request message, wherein the updated message replaces at the base station previous information with aggregate information on a connection.

4. An apparatus, comprising:
at least one processor;
at least one memory containing executable instructions that when executed provide operations comprising:
allocating connection-specifically a capacity granted by a base station;
transmitting at least one of a plurality of capacity request messages, wherein the at least one of the capacity request messages comprises an aggregate capacity request message comprising information based on a previous capacity request message sent by the subscriber station, wherein the aggregate message is sent to overcome a mismatch caused by a collision preventing receipt of the previous capacity request message; and
transmitting data from a subscriber station to the base station according to the capacity allocation made by the subscriber station.

5. The apparatus of claim 4, wherein the transmitter is further configured to transmit an updated capacity request message comprising information based on an aggregate capacity request message, wherein the updated message replaces at the base station previous information on a connection.

6. A method, comprising:
transmitting at least one of a plurality of capacity request messages of at least one connection;
receiving a capacity grant message from a base station, the capacity grant message monitored by the base station;

connection-specifically allocating the capacity granted by the base station;

transmitting the at least one capacity request message, wherein the at least one of the capacity request messages comprises an aggregate capacity request message comprising information based on a previous capacity request message sent by a subscriber station, wherein the aggregate message is sent to overcome a mismatch caused by a collision preventing receipt of the previous capacity request message; and transmitting data from the subscriber station to the base station according to a the connection-specific allocation made by the subscriber station.

7. The method of claim 6, wherein the transmitting comprises transmitting an updated capacity request message that replaces, at the base station, previous capacity request information with aggregate capacity request information connection-specifically.

8. The method of claim 6, wherein the transmitting comprises transmitting an updated capacity request message that replaces information based on need for bandwidth for a connection.

9. The method of claim 6, further comprising:
transmitting update messages comprising information based on previous capacity requests, wherein the update messages replace at the base station previous information on a connection.

10. A method, comprising:
receiving at least one of a plurality of capacity request messages from a subscriber station:
granting a transmission capacity to the subscriber station;
transmitting a capacity grant message to the subscriber station;
monitoring the at least one of the plurality of capacity request messages received from the subscriber station, the capacity grant message sent by a base station, and data transmission received from the subscriber station,
wherein the at least one of the capacity request messages comprises an aggregate capacity request message comprising information based on a previous capacity request message sent by the subscriber station, and
determining whether a mismatch exists between the granted transmission capacity and the data transmission received from the subscriber station based on information included in the aggregate capacity request message received from the subscriber station, the capacity grant message sent to the subscriber station, and the data transmission received from the subscriber station.

11. The method of claim 10, further comprising:
monitoring data based on messages and transmissions using a memory table.

12. A computer program embodied on a non-transitory computer-readable medium, the computer program configured to control a processor to perform operations comprising:

transmitting at least one of a plurality of capacity request messages of at least one connection;
receiving a capacity grant message from a base station, the capacity grant message monitored by the base station;
connection-specifically allocating the capacity granted by the base station;
transmitting at least one of the capacity request messages wherein the at least one capacity request messages comprises an aggregate capacity request message comprising information based on a previous capacity request message sent by a subscriber station, wherein the aggregate message is sent to overcome a mismatch caused by a collision preventing receipt of the previous capacity request message; and
transmitting data from the subscriber station to the base station according to the capacity allocation made by the subscriber station.

13. The computer program of claim 12, further comprising:
transmitting an updated capacity request message comprising information based on a previous capacity request message, wherein the updated message replaces at the base station previous capacity request information on a connection.

14. A computer program embodied on a non-transitory computer-readable medium, the computer program configured to control a processor to perform operations comprising:
receiving at least one of a plurality of capacity request messages of at least one connection from a subscriber station;
granting a transmission capacity to the subscriber station;
transmitting a capacity grant message to the subscriber station; and
monitoring the at least one of the plurality of capacity request messages received from the subscriber station, the capacity grant message sent by a base station, and data transmission received from the subscriber station, wherein at least one of the capacity request messages comprises an aggregate capacity request message comprising information based on a previous capacity request message sent by the subscriber station, and
determining whether a mismatch exists between the granted transmission capacity and the data transmission received from the subscriber station based on information included in the aggregate capacity request message received from the subscriber station, the capacity grant message sent to the subscriber station, and the data transmission received from the subscriber station.

15. The computer program of claim 14, further comprising:
receiving an updated capacity request message comprising information based on the aggregate capacity request, wherein the updated capacity request message replaces previous information on a connection.

* * * * *